United States Patent
Zarowski et al.

(10) Patent No.: US 9,581,699 B2
(45) Date of Patent: Feb. 28, 2017

(54) DISTORTIONLESS MEAN PHASE ANTIJAM NULLING OF GPS SIGNALS

(71) Applicant: Mayflower Communications Company, Inc., Burlington, MA (US)

(72) Inventors: Christopher Jonathan Zarowski, Burlington, MA (US); Jianhui Luo, Wayland, MA (US); Huan-Wan Tseng, Westford, MA (US)

(73) Assignee: Mayflower Communications Company, Inc., Bedford, MA (US)

( * ) Notice: Subject to any disclaimer, the term of this patent is extended or adjusted under 35 U.S.C. 154(b) by 420 days.

(21) Appl. No.: 14/093,572

(22) Filed: Dec. 2, 2013

(65) Prior Publication Data

US 2015/0226856 A1    Aug. 13, 2015

Related U.S. Application Data

(60) Provisional application No. 61/778,675, filed on Mar. 13, 2013.

(51) Int. Cl.
*G01S 19/21* (2010.01)
*G01S 19/36* (2010.01)

(52) U.S. Cl.
CPC ............. *G01S 19/21* (2013.01); *G01S 19/36* (2013.01)

(58) Field of Classification Search
CPC ................................. G01S 19/21; G01S 19/36
USPC ..................................................... 342/357.59
See application file for complete search history.

(56) References Cited

U.S. PATENT DOCUMENTS

| | | | |
|---|---|---|---|
| 2012/0286994 A1* | 11/2012 | Letestu | G01S 19/21 342/357.59 |
| 2013/0241768 A1* | 9/2013 | Petersen | G01S 19/43 342/357.27 |
| 2014/0152504 A1* | 6/2014 | Kulaib | G01S 5/04 342/437 |

* cited by examiner

*Primary Examiner* — Harry Liu
(74) *Attorney, Agent, or Firm* — Kaplesh Kumar

(57) ABSTRACT

System and method for mean phase compensation of code and carrier phase distortions induced by Space Time Adaptive Processing (STAP) filters used for removing interferences from received GPS signals. The phase distortion is mitigated (without the use of beamforming) using a single STAP filter for processing the GPS satellite channels in which appropriate bundling of constraints is applied to the filter weights. The complete solution can be contained in the antenna electronics with no required changes to the legacy GPS receiver.

36 Claims, 15 Drawing Sheets

Figure 15

| Jammer Scenario | | Unconstrained Nulling (UN) | | Constrained Nulling (CN) | | Null Depth Difference (CN-UN in dB) |
|---|---|---|---|---|---|---|
| | | Mean Null Depth (dB) | σ (dB) | Mean Null Depth (dB) | σ (dB) | |
| All CW Jammers | J1 | -24.5 | 0.9 | -34.3 | 5.5 | -9.8 |
| | J2 | -71.5 | 6.7 | -67.4 | 5.7 | 4.1 |
| | J3 | -82.5 | 6.5 | -72.0 | 5.7 | 10.5 |
| All BB Jammers | J1 | -28.6 | 1.2 | -34.0 | 5.7 | -5.4 |
| | J2 | -65.5 | 5.7 | -62.5 | 5.6 | 3.0 |
| | J3 | -65.4 | 5.8 | -63.3 | 5.7 | 2.1 |

DISTORTIONLESS MEAN PHASE ANTIJAM NULLING OF GPS SIGNALS

This application claims the benefit of U.S. Provisional Application No. 61/778,675, filed on Mar. 13, 2013.

The present invention was made with U.S. Government support under Contract No. N68335-11-C-0228 awarded by the U.S. Naval Air Warfare Center. The U.S. Government has certain rights to this invention.

FIELD OF THE INVENTION

This invention deals generally with the Global Positioning System and other Global Navigation Satellite Systems (hereinafter collectively "GPS") navigation data measurements using a GPS receiver in a continuously or intermittently jammed environment.

BACKGROUND OF THE INVENTION

In this specification, including its claims, the term GPS is to be construed broadly, and must be read to include not only the Global Positioning System, but all Global Navigation Satellite Systems ("GNSS") using CDMA ("Code Division Multiple Access") technology. Likewise, the terms "jamming" and "interference signals," which are used interchangeably, are to be construed broadly as well, and include without limitation interference signals emitted by both narrowband and wideband jammers.

Space Time Adaptive Processing (STAP) for antijam has been used to suppress jamming (interfering) signals that may corrupt GPS navigation. The most basic STAP filter design goal is to compute the STAP filter weights vector to do no more than minimize the output power of the filter while avoiding the null weight vector solution. As a convenience, we refer to this herein as Unconstrained Nulling. As the GPS signals are below the receiver system noise floor while jamming signals are commonly above the noise floor, the STAP filter tends to suppress the jammer signal(s) with little attenuation of the GPS signal, unless the GPS signals and jammer signals arrive at the antenna array from the same or similar direction(s). However, in achieving the basic design goal of minimizing the STAP filter output power, the prior art STAP filter typically induces phase (carrier and code) distortion to the GPS signals.

The current industry solution for compensating for STAP-induced code phase and carrier phase bias distortions in a jamming environment involves use of a beamforming-with-nulling architecture to form individual beams toward specific satellites used in the navigation solution; this procedure is large, costly, and complicated. The digital beamforming-with-nulling antijam electronics solution introduces minimum GPS code phase and carrier phase bias errors, as compared to the digital "nulling only" solution. This traditional beamforming approach to suppressing interference and mitigating phase distortion to the desired GPS signals employs beamforming with constraints. The optimal design goal is to minimize the STAP filter array output power while simultaneously fixing the gain and producing an overall linear phase response in the direction of the desired GPS signal. Mathematically, this is posed as a Quadratic Programming Problem ("QPP") with constraints, usually in the form of equality constraints.

Digital beamforming, however, requires extensive antenna calibrations, a large antenna array, additional digital signal processing complexity for forming individual beams toward specific satellites used for obtaining the navigation solution, changes to the receiver design, and a high speed digital interface between the digital receiver and the digital antenna electronics. This solution ordinarily requires a separate STAP filter for each GPS satellite signal desired to be tracked, resulting in a complex and undesirable signal processing architecture that requires the parallel implementation of multiple STAP filters where the filter order might be high (tens of taps or more), and has multiple independent signal paths (one from each STAP filter) to the GPS receiver.

Since the beamforming solution adds significant complexity to the antenna electronics and requires major modifications to the platform GPS receiver, it is not desirable for SWAP-constrained platforms (SWAP=size, weight, and power), such as 'small' unmanned aerial vehicles (UAVs) and rotary wing aircraft. While the digital beamforming antenna electronics and receiver solution with its attended complexity may be acceptable on a large platform, such as a ship or fixed wing aircraft, it does not meet the tight SWAP constraints of a rotary wing aircraft. The rotary wing aircraft application presents additional technology challenges to the digital beamforming anti-jam antenna electronics because of rotor blade jammer reflections and modulation of GPS signals on such platforms, which need to be addressed.

For the above reasons, innovative antenna signal processing solutions are required to address this technology gap for rotary wing aircraft. An effective SWAP optimized antijam solution that works for rotary wing aircraft is needed. Specifically, innovative antenna antijam signal processing solutions are required that work in the rotary wing aircraft environment of rotor blade modulation and jammer reflection, employ a small antenna, for example (and not by way of any limitation) a small Controlled Reception Pattern Antenna array (s-CRPA), mitigate the effect of potential code delay and carrier phase bias introduced by STAP filter antenna nulling solutions, and require minimum to no changes to the platform's legacy GPS receiver.

SUMMARY OF THE INVENTION

The present invention overcomes the disadvantages of the previous antijam methods based on an innovative modification of the STAP-based antijam concept described in A. J. O'Brien, I. J. Gupta, "An Optimal Adaptive Filtering Algorithm with Zero Antenna-Induced Bias for GNSS Antenna Arrays," Navigation, 57(2), Summer 2010, pp. 87-100 (hereinafter "O'Brien1"). The beamforming concept therein maximizes carrier-to-noise ratio (CNR) at the STAP array output, subject to enforcing a distortionless response to desired signals in a mean (i.e. average) sense. However, the resulting STAP filter only applies to a single GPS signal, and so multiple STAP filters are required to handle multiple simultaneous GPS signals. Thus, the solution in O'Brien1 follows the traditional beamforming architecture.

The STAP filter disclosed and claimed herein uses an algorithm, referred to as Constrained Nulling, that minimizes jammer power with appropriate constraints for removing the STAP filter induced channel phase distortions, thereby reducing the effects of GPS carrier phase and code-phase (pseudo-range) biases. The significance of the instant invention's adaptive weighting algorithm for compensating the code phase and carrier phase biases introduced by the STAP antenna nulling system in jamming is that it mitigates the complexity, size, and cost concerns of the current beamforming-with-nulling solutions and allows operation on rotary wing platforms. The compensation algorithm solution can be readily implemented as an enhancement to existing low cost STAP-based antijam solutions.

An important aspect of this antijam code phase and carrier phase bias error compensation solution is that it is fully contained within the antenna electronics and requires little, if any, change to the platform's legacy GPS receiver (although including the compensation solution in the receiver is an option that can be exercised if desired). In contrast, as discussed above, the current beamforming-with-nulling antijam solutions, e.g. (O'Brien1; See also, J. Capon, "High-Resolution Frequency-Wavenumber Spectrum Analysis," Proc. IEEE, 57(8), Aug. 1969, pp. 1408-1418 (hereinafter "Capon")), or other proposed nulling solutions to mitigate the bias errors (See, e.g., A. J. O'Brien, I. J. Gupta, "Mitigation of Adaptive Antenna Induced Bias Errors in GNSS Receivers," IEEE Trans. on Aerospace and Electronic Systems, 47(1), Jan. 2011, pp. 524-538, hereinafter "O'Brien2"), require significant changes to the platform receiver.

As mentioned above, the original O'Brien1 algorithm is a beamforming solution having the unfavorable architecture of FIG. 1, i.e. requiring parallel implementation of multiple STAP filters, e.g. 12, 14, and thereby having multiple independent signal paths, e.g. 11, 15, i.e. one path from each STAP filter to the GPS receiver. Thus, the instant invention's improvement upon the O'Brien1 approach arrives at the desired non-beamforming architecture in FIG. 2 through the process of bundling/stacking (See, K. M. Buckley, "Broad-Band Beamforming and the Generalized Sidelobe Canceller," IEEE Trans. on Acoust., Speech, and Signal Proc., vol. ASSP-34, no. 5, October 1986, pp. 1322-1323) $N_S$ distortionless response constraints for $N_S$ different GPS satellites so that only one STAP filter 22 (FIG. 2) is needed to null the interference and mitigate the GPS signal distortion, instead of $N_S$ such filters as in the prior art beamforming approach discussed above. The main limitation of the instant invention's constraint bundling approach is that the resulting single STAP filter 22 can only be applied to $N_S \leq M$ satellite signals at the same time, where M is the number of signal channels output from the antenna array.

Moreover, the process of constraint bundling can give rise to an ill-conditioned linear system of equations that need to be solved for the desired STAP weights. To mitigate this ill-conditioning, a novel regularization procedure has been devised to improve the condition number of the weight computation problem. The resulting algorithm provides a distortionless non-beamforming, mean carrier/code-phase compensation antijam capability, which, for brevity, is referred to herein as Constrained Nulling.

Simulations have been performed, assuming GPS L1 band signals, for comparing the nulling performance of Unconstrained Nulling ("UN") with that of Constrained Nulling ("CN") and for confirming that the CN system frequency response is indeed distortionless on the average in the desired GPS signal directions. The STAP-5 (five-tap STAP) filter design used for the simulations was based on bundling distortionless response constraints for five GPS satellites and an assumed five-element ideal uniform circular antenna array. Modeling efforts have shown that the Code/Carrier Phase Compensation (hereinafter "CPC") constrained STAP nulling not only suppresses jammer signals, but also simultaneously constrains the STAP weights to mitigate distortion to the satellite signals of interest with little loss of antijam protection.

In the simulation scenario considered herein, the jammers are at a low elevation angle in relation to the satellites. These deployments modeled antijam on an airborne platform with jammers on the ground. Three jammers were active, either all three were broadband (BB) jammers with power uniformly spread over the L1 band or all three were narrowband (CW) jammers (frequencies at L1 band center and offsets ±10 MHz from L1 band center). Jammer-to-noise ratios were about 45 dB in all cases. Mean null depths were compared based on 100 Monte Carlo runs, and ±1σ values displayed to indicate run-to-run variation. Considering the null depth differences and accounting for the run-to-run variation, it was demonstrated that the nulling performance of Constrained Nulling, despite the application of the distortionless response constraints, is comparable to that of Unconstrained Nulling.

The modeling and simulation efforts have demonstrated via 500 run Monte Carlo simulations of the phase response and group delay in GPS signal directions that the Constrained Nulling phase is much more linear and the group delay much 'flatter' over the P(Y)-code band than for Unconstrained Nulling. Thus, the performance simulations have shown that the STAP-based Constrained Nulling suppresses the jammer signals even as it simultaneously constrains the STAP filter weights to mitigate distortion of the satellite signals of interest with little loss of antijam protection.

A major advantage of the Constrained Nulling solution is that it can be implemented entirely within the antijam antenna electronics and, therefore, does not require customized multichannel modification of the GPS receiver, thereby representing a SWAP-optimized solution for easy integration onto space-constrained platforms.

The features and advantages of the present invention are better understood when considered in conjunction with the accompanying drawings. The drawings are primarily for illustration and must not be construed as limiting. Other embodiments of the present invention apparent to those of ordinary skill in the art are within the present invention's scope. The scope of the invention is to be limited only by the claims, and not by the drawings or description herein.

BRIEF DESCRIPTION OF THE DRAWINGS

FIG. 15 is a table summarizing null depths and ±1σ values based on the 100 run results for both CW and BB jamming comparing CN to UN for all three jammers.

DETAILED DESCRIPTION OF THE INVENTION

The mathematical models used to assess the distortion of the GPS signals by a STAP-based anti-jamming algorithm as well as its nulling performance are presented below, followed by a detailed description of the Constrained Nulling algorithm. Together they form the underpinnings of the present invention and provide the basis for the simulation results discussed in this specification.

Transfer Function Model for Distortion and AJ Null Depth

Figure 2:
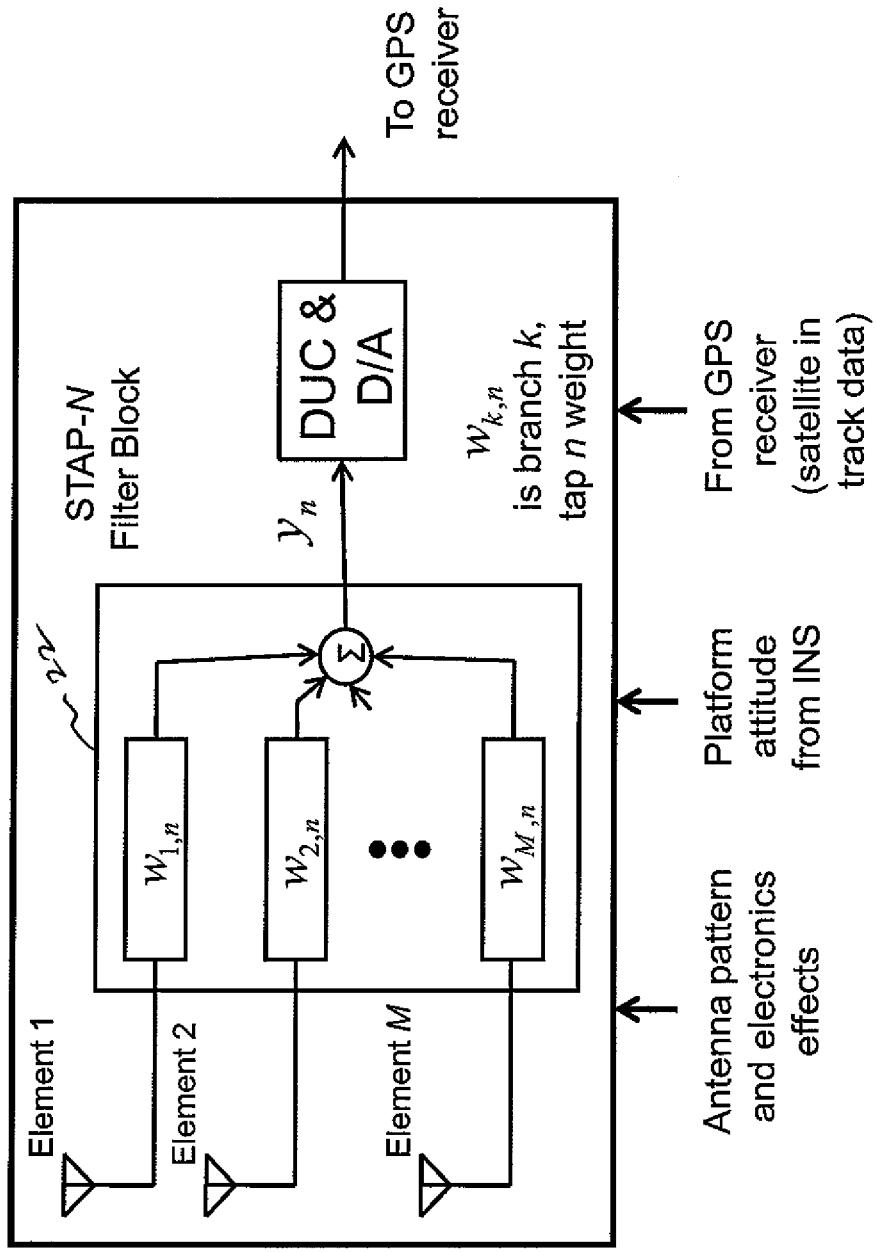
FIG. 2 is a block diagram of the basic non-beamforming (non-beamsteering) solution for anti-jamming with or without constraints to mitigate distortion to desired signals (e.g., GPS/GNSS), where the smallest boxes containing labels of the form $w_{k,n}$ represent weights (coefficients) for N-tap FIR filters composing a STAP filter branch.

From first principles linear system analysis, the Fourier domain transfer function from the antenna to the output sample sequence denoted as $y_n$ in FIG. 2 may be stated as $$H(\theta, \varphi, f) = \sum_{k=1}^{M} W_k(f) F_k(f) A_k(\theta, \varphi, f) \quad (1)$$

where Equation (1) fully characterizes the system response due to the combined effects of the STAP filter, antenna electronics, and antenna array in the direction (azimuth, elevation=) (θ, φ) which is the direction-of-arrival (DOA) of the signal-of-interest (SOI).

It is apparent that the system directional response can only be due to the antenna array for which $A_k(\theta, \varphi, f)$ is the directional and frequency response for antenna element (or mode, if mode-forming of some kind is employed) indexed "k." The antenna electronics transfer function for the element "k" signal path is denoted as $F_k(f)$. The summation in Equation (1) implies that there are "M" signal paths corresponding to the "M" antenna elements (or modes) in the system. For a STAP-N filter (i.e., N-tap STAP filter), the transfer function for the STAP filter signal path of branch "k" is:

$$W_k(f) = \sum_{n=0}^{N-1} w_{k,n} e^{-j2\pi f T n} \quad (2)$$

This is the transfer function for a N-tap FIR filter running at the data converter sampling period denoted T. The transfer function model in Equation (1) above is well known (e.g., O'Brien2; See also, R. L. Fante, J. J. Vaccaro, "Wideband Cancellation of Interference in a GPS Receive Array," IEEE Trans. on Aerospace and Electronic Systems, 36(2), Apr. 2000, pp. 549-564). It may be noted that the transfer function model of Equation (1) implicitly assumes that the STAP weights $w_{k,n}$ are fixed in time. In reality, the STAP weights are computed and updated by some adaptive scheme, and so this stationary weights assumption is strictly valid only for a limited time. Nevertheless, the model in Equation (1) is invaluable for analysis, simulation and design.

The signal of interest, SOI might be the jammer signal or it might instead be the GPS signal, depending upon whether we are considering the quality of the antijam ("AJ") protection or the distortion to the GPS signal. In fact, for a jammer possessing the DOA (θ, φ) (θ, φ) the plot of 20 $\log_{10}|H(\theta, \varphi, f)|$ (dB) is often called the "nulling pattern." It may be used to assess the level of AJ protection offered by any algorithm that computes the STAP weights $w_{k,n}$ for such a purpose. As well, 20 $\log_{10}|H(\theta, \varphi, f)|$ (dB) is the gain offered to a GPS signal having DOA (θ, φ). The phase response in DOA (θ, φ) is the argument of H(θ, φ, f) given by $$\phi(\theta, \varphi, f) = \operatorname{Tan}^{-1} \frac{\operatorname{Im}[H(\theta, \varphi, f)]}{\operatorname{Re}[H(\theta, \varphi, f)]} \quad (3)$$

The corresponding group delay is the derivative $$\tau_g(\theta, \varphi, f) = -\frac{d}{df} \phi(\theta, \varphi, f) \quad (4)$$

Equations (3) and (4) can be used to characterize the distortion to the GPS signal. Corresponding to the transfer function (1) is a filter with unit sample response sequence h(θ, φ, n)=$h_n$(θ, φ) such that $$H(\theta, \varphi, f) = \sum_{n=0}^{\infty} h_n(\theta, \varphi) e^{-j2\pi f T n} \quad (5)$$

This model assumes that the distortion model is that for a causal system. It also assumes that $h_n$(θ, φ) corresponds to an infinite impulse response (IIR) filter. The IIR filter model may, however, be more practically approximated as a finite impulse response (FIR) filter possessing the transfer function:

$$H(\theta, \varphi, f) = \sum_{n=0}^{Q-1} h_n(\theta, \varphi) e^{-j2\pi f T n} \quad (6)$$

In this event, the STAP-based antijam system would be distortionless in the GPS signal direction (θ, ϕ) only if the distortion model unit sample response is either conjugate symmetric or conjugate anti-symmetric about the center tap. This corresponds to the filter of Equation (6) possessing a linear phase response. The group delay will then be a constant with respect to frequency and so the system will be non-dispersive offering no phase distortion to a desired signal from direction (θ, ϕ).

The severity of the distortion behavior of the STAP-based antijam algorithm, therefore, depends on how much the transfer function H(θ, ϕ, f) deviates from a linear phase (i.e. distortionless) response, or equivalently how much it deviates from a constant group delay (i.e., dispersionless) response.

Uniform Circular Array ("UCA") Antenna Model

The simulation studies performed involved working with an idealized antenna pattern, namely, the uniform circular array ("UCA") model. The UCA model is superficially similar to small CRPA antenna patterns, excepting that the UCA model has no mode forming and neglects antenna element interactions. Use of the UCA pattern, however, allows the gaining of important analytical insight into the development of distortionless antijam algorithms. The modeling methodology below follows M. P. Moody, "Resolution of Coherent Sources Incident on a Circular Antenna Array," Proc. IEEE, 68(2), Feb. 1980, pp. 276-277, hereinafter "Moody."

Following Moody, it is assumed that the M elements of the UCA are placed on a circle at the following azimuth positions:

$$\theta_k = \frac{2\pi}{M}k \qquad (7)$$

where $$k = 0, 1, \ldots, M-1$$

These UCA elements are assumed (for simulation purposes) to be located on a circle of radius D=0.1 meters to roughly emulate a small CRPA. The center of the circle comprises the center of the body-frame reference system for the antenna wherein the DOA is defined.

The UCA antenna frequency response for wavelength λ (meters) is $$A_k(\theta, \varphi, f) = \exp\left\{j\frac{\pi D}{\lambda}\sin\left(\frac{\pi}{2} - \varphi\right)\cos\left(\frac{2\pi}{M}k - \theta\right)\right\} \qquad (8)$$

where (j=√−1m) and λf=c, where c is the speed of light (meters/second).

According to Moody, M>2 πD/λ should hold. The simulation work herein simplifies matters further by assuming that λ always corresponds to L1 band center, which eliminates the frequency dependence otherwise present in Equation (8).

In this event, the time-domain model for the UCA antenna pattern is specified by:

$$a_k(\theta, \varphi, t) = A_k(\theta, \varphi)\delta(t) \qquad (9)$$

which is the impulse response of the antenna array in all directions, and so δ(t) is the Dirac distribution generalized function. The antenna now has a directional response that is implicitly assumed to be the same over the entire L1 band. In discrete-time modeling, Equation (9) is replaced by:

$$a_{k,n}(\theta, \varphi) = A_k(\theta, \varphi)\delta_n \qquad (10)$$

where $\delta_n$ is the unit sample sequence (i.e. Kronecker delta sequence).

The simulation modeling herein also assumes perfect antenna electronics, i.e., $F_k(f)=1$ for all elements and all frequencies hence $f_{k,n}=\delta_n$. Therefore, the time-domain model for the distortion experienced by a GPS signal due to STAP simplifies to:

$$h_n(\theta, \varphi) = \sum_{k=1}^{M} w_{k,n} * f_{k,n} * A_k(\theta, \varphi)\delta_n = \sum_{k=1}^{M} A_k(\theta, \varphi)w_{k,n} \qquad (11)$$

The asterisks in Equation (11) denote discrete-time convolution. It is apparent from the simplified model of Equation (11) that the directional dependence of the STAP-based signal distortion is due to the antenna pattern but the frequency dependence is due primarily to the STAP weights. The antenna pattern does, however, modify the frequency response for each branch in the STAP filter by a scaling and a phase shift. In view of Equations (2) and (11), Equation (1) can be simplified as follows:

$$H(\theta, \varphi, f) = \sum_{k=1}^{M} A_k(\theta, \varphi)\sum_{n=0}^{N-1} w_{k,n}e^{-j2\pi fTn} \qquad (12)$$

Equations (11) and (12) comprise a Discrete-Time Fourier Transform ("DTFT") pair. Also, Equation (12) represents a FIR filter which is an instance of the general form in Equation (6) above.

Unconstrained Nulling ("UN")

As noted earlier, the STAP weights are computed as the result of the solution to an optimization problem. The basic optimization problem in UN merely aims to minimize the STAP filter output power P(w) with respect to w the vector of STAP weights $w_{k,n}$. However $P(\underline{w})=\underline{w}^H\hat{R}\underline{w}$, (where $\hat{R}\in C^{NM\times NM}$ is the complex-valued sample covariance matrix) is a positive definite quadratic form for which the unique global minimizing solution is the degenerate solution ŵ=0. To avoid this 'degeneracy' it is necessary to apply a constraint upon the weights. In this case the optimization problem may be stated as follows:

$$\underline{\hat{w}} = \mathop{\mathrm{argmin}}_{\underline{w}} \underline{w}^H\hat{R}\underline{w} \qquad (13)$$

subject to $$\underline{w}^H\underline{u} = 1$$

The solution to QPP of Equation (13) requires that u is a constant (but non-zero) vector that acts to prevent the weight vector of the solution from being identically zero-valued. The simplest choice is a so-called pseudo-steering vector which is a unit vector. The unity-valued element is typically selected to correspond to a branch center tap. Where mode forming is employed, the branch of choice is usually that corresponding to the omni (reference) mode. From the well-known method of Lagrange multipliers it is trivial to prove that the solution to Equation (13) is:

$$\hat{w} = \frac{\hat{R}^{-1}u}{u^H \hat{R}^{-1} u} \quad (14)$$

Unconstrained beamforming, by comparison, uses the solution $\hat{w}=\underline{a}(\theta, \phi, f)$ where $\underline{a}(\theta, \phi, f)$ is the steering vector in the signal-of-interest direction (e.g., GPS/GNSS) at frequency f where a constant gain is desired. However, this particular solution offers no nulling of interference.

As yet another contrast, the Capon beamforming solution minimizes $P(\underline{w})$ and also imposes the constraint $\underline{w}^H \underline{a}(\theta, \phi, f)=1$ at a signal frequency f of interest, and the solution to the resulting QPP will have a unity gain and a zero-phase response in the $(\theta, \phi)$ direction. That is, we obtain $H(\theta, \phi, f)=1$. Thus, this Capon minimum variance distortionless response (MVDR) beamforming is a particular version of Constrained Nulling due to the imposition of this distortionless constraint.

In any case, we see that beamforming solutions of any sort need the antenna array pattern, and so calibration issues inevitably arise.

Constrained Nulling: Beamforming Architecture

Capon's MVDR Beamforming algorithm mentioned above is a version of Constrained Nulling that nominally results in a perfectly distortionless response for each STAP weight vector that is generated. However, this perfection is obtained at a high cost as the application to nulling with a distortionless response over many signal directions and over a band of frequencies (the broadband (BB) formulation) results in working with multiple filters (one per GPS satellite in our considerations; See FIG. 1), with each filter of potentially high order often being defined in the Fourier domain to improve implementation efficiency (See, e.g., N. L. Owsley, *Systolic Array Adaptive Beamforming*, NUSC Tech. Rep. 7981, Naval Underwater Systems Center, Newport, R.I., and New London, Conn., 21 Sep. 1987). And so here we introduce the alternative beamforming solution first considered in O'Brien1, which permits working with STAP filters of rather low order (e.g., 5-tap, or N=5). In the next sub-section we will show how to bundle (stack) the constraints in a manner so as to arrive at a single low order STAP filter applicable to multiple GPS satellites at the same time, and one that is implemented in accordance with the architecture in FIG. 2 instead of that in FIG. 1.

Formally, the QPP optimization problem solved in O'Brien1 is:

$$\{\hat{w}, \hat{\alpha}\} = \underset{\{w, \alpha\}}{\arg\min} \, w^H \hat{R} w \quad (15)$$

subject to $$C^H \underline{w} = \underline{f}(\alpha)$$

where $$C = [\underline{s}(0) \, \underline{\dot{s}}(0)] \in C^{NM \times 2} \quad (16a)$$

$$\underline{f}(\alpha) = [1 \, j\alpha]^T \in C^{2 \times 1}, \text{ but } \alpha \in \mathfrak{R} \quad (16b)$$

The sample covariance matrix in QPP of Equation (15), denoted $\hat{\tilde{R}}$ and explained in the next paragraph, is different from the previously discussed sample covariance matrix $\hat{R}$, and the tilde '~' notation is used to emphasize this important distinction. It may be noted that $\hat{\tilde{R}}$ in QPP of Equation (15) has been substituted for $\Psi_u$ in O'Brien1. The column vectors denoted as $\underline{s}(0)$ (s-vector) and $\underline{\dot{s}}(0)$ (sdot-vector) within the constraint matrix C play a role analogous to the steering vectors of Capon's method discussed earlier. These vectors are defined below.

The method in O'Brien1 requires that the samples be subjected to chip-matched filtering before forming the sample covariance matrix, according to the traditional procedure used to get $\hat{R}$. This, in turn, implies that the beamforming concept in O'Brien1 by contrast to Capon's method is GPS signal dependent in the following way. For example, if the method is intended to be applied to the P(Y)-code, then the chip-matched filter will have a unit sample response that is a sampled square pulse of duration equal to one P(Y)-code chip. For binary offset carrier (BOC) codes, such as the M-code, the chip-matched filter unit sample response will be more complicated, typically being some form of sampled non-return-to-zero (NRZ) pulse.

The weight calculation part of the optimization problem in Equation (15) is provided by the "Frost" calculation; See, O. L. Frost, III, "An Algorithm for Linearly Constrained Adaptive Array Processing," Proc. IEEE, 60(8), Aug. 1972, pp. 926-935:

$$\hat{w} = \hat{\tilde{R}}^{-1} C [C^H \hat{\tilde{R}}^{-1} C]^{-1} \underline{f}(\hat{\alpha}) \quad (17)$$

where, from O'Brien1

$$\hat{\alpha} = \frac{\text{Im}\{\dot{s}^H(0) \hat{\tilde{R}}^{-1} \underline{s}(0)\}}{\underline{s}^H(0) \hat{\tilde{R}}^{-1} \underline{s}(0)} \quad (18)$$

The s-vector in the constraint matrix C of Equation (16a) is the so-called "reference correlation vector" (O'Brien1) given by a Fourier integral $$[s_k(\tau)]_n = \sqrt{P_d} \int_{-\infty}^{\infty} S_{dd}(f) F_k(f) A_k(\theta, \varphi, f) e^{-j2\pi f[nT + \tau - \tau_r]} df \quad (19)$$

and its first derivative with respect to code-phase error $\tau$, i.e., $\underline{\dot{s}}(\tau) = d\underline{s}(\tau)/d\tau$, with both cases evaluated at $\tau=0$.

The time-delay $$\tau_r = \left\lfloor \frac{N}{2} \right\rfloor T \quad (20)$$

associates with the delay at a STAP-N filter branch center tap, where T is the data converter sampling period, and the coefficient $[s_k(\tau)]_n$ associates with the branch k, tap n, STAP weight $w_{k,n}$. The function $S_{dd}(f)$ is the power spectral density (PSD) for the spreading code of interest (e.g. C/A, P(Y), M, MBOC(6,1,1/11), etc.). Thus, the solution for the STAP filter weights depends upon the choice of the spreading code. $P_d$ is the received signal power; however, for the weight calculation this is normally set to unity.

It is necessary in practice to be able to compute the Fourier integral of Equation (19). A numerical quadrature rule would be used in most cases as the integral is analytically intractable in general. However, for the UCA antenna modeling discussed earlier, the Fourier integrals of Equation

(19) have simple, illustrative closed-form expressions. Based on the earlier assumptions, Equation (19) simplifies to:

$$[s_k(\tau)]_n = \sqrt{P_d}\, A_k(\theta, \varphi) \int_{-\infty}^{\infty} S_{dd}(f) e^{-j2\pi f[nT+\tau-\tau_r]} df \quad (21)$$

which is the inverse Fourier transform of the ranging code PSD $$R_{dd}(\tau) = \int_{-\infty}^{\infty} S_{dd}(f) e^{j2\pi f \tau} df = R_{dd}(-\tau) \quad (22)$$

where $R_{dd}(\tau)$ represents the statistical autocorrelation function for the ranging code related to its PSD.

To illustrate, for the P(Y)-code, Equation (22) simply evaluates to $$R_{dd}(\tau) = 1 - \frac{|\tau|}{T_c} \quad (23)$$

for $|\tau| \leq T_c$ (and is zero otherwise)

where $T_c$ is the chip duration.

Equation (21) then reduces to $$[s_k(\tau)]_n = \sqrt{P_d} A_k(\theta,\phi) R_{dd}(\tau+nT-\tau_r) \quad (24)$$

But since we are only interested in $\tau=0$, this becomes $$[s_k(0)]_n = \sqrt{P_d} A_k(\theta, \phi) R_{dd}(nT-\tau_r) \quad (25)$$

Besides Equation (25), we also need the derivatives of $[s_k(\tau)]_n$ with respect to $\tau$, also evaluated at $\tau=0$. Since the tent (triangle) pulse in Equation (23) is piecewise linear, $$\dot{R}_{dd}(\tau) = \begin{cases} 0, & \tau \geq T_c \\ -1/T_c, & 0 < \tau < T_c \\ 0, & \tau = 0 \\ +1/T_c, & -T_c < \tau < 0 \\ 0, & \tau \leq -T_c \end{cases} \quad (26)$$

However, here we define the derivative at $\tau=0$ to be zero on the basis that practical system band limiting (from antenna effects and antenna electronics) will blur any sharp edges and round off the otherwise sharp peak at $\tau=0$ in $R_{dd}(\tau)$. Therefore, $$\frac{d}{d\tau}[s_k(\tau)]_n \Big|_{\tau=0} = \sqrt{P_d}\, A_k(\theta, \varphi) \dot{R}_{dd}(nT - \tau_r) \quad (27)$$

Assuming N=M=5 (STAP-5 for a 5-element antenna array) for illustration, we obtain:

$$[s_k(0)]_n = A_k(\theta, \varphi) R_{dd}((n-2)T) \quad (28)$$

$$\frac{d}{d\tau}[s_k(\tau)]_n \Big|_{\tau=0} = A_k(\theta, \varphi) \dot{R}_{dd}((n-2)T) \quad (29)$$

As mentioned earlier, we have used $P_d=1$.

We now have a specific example of how to populate the constraint array C, albeit only for an idealized antenna model.

It is again noted that the distortionless constraints method in O'Brien1 produces a distortionless response only on the average. For a given weight vector update, the distortion model transfer function may not in fact be linear in phase. This is obvious from the detailed theory in O'Brien1, and has been observed in simulations. Another observation, not noted in O'Brien1, is that for a given branch k, the sequence $[s_k(0)]_n$ is symmetric about the center tap index n =2. On the other hand, the sequence $[\dot{S}_k(0)]_n$ is anti-symmetric about the center tap index. These symmetries are inherited from the structure of the code autocorrelation function and its derivative. The overall impact of this is that the unit sample response corresponding to the distortion model transfer function $H(\theta, \phi, f)$ on the average has conjugate symmetry, and so is linear phase on the average.

Constrained Nulling: Non-beamforming Architecture

Figure 1:
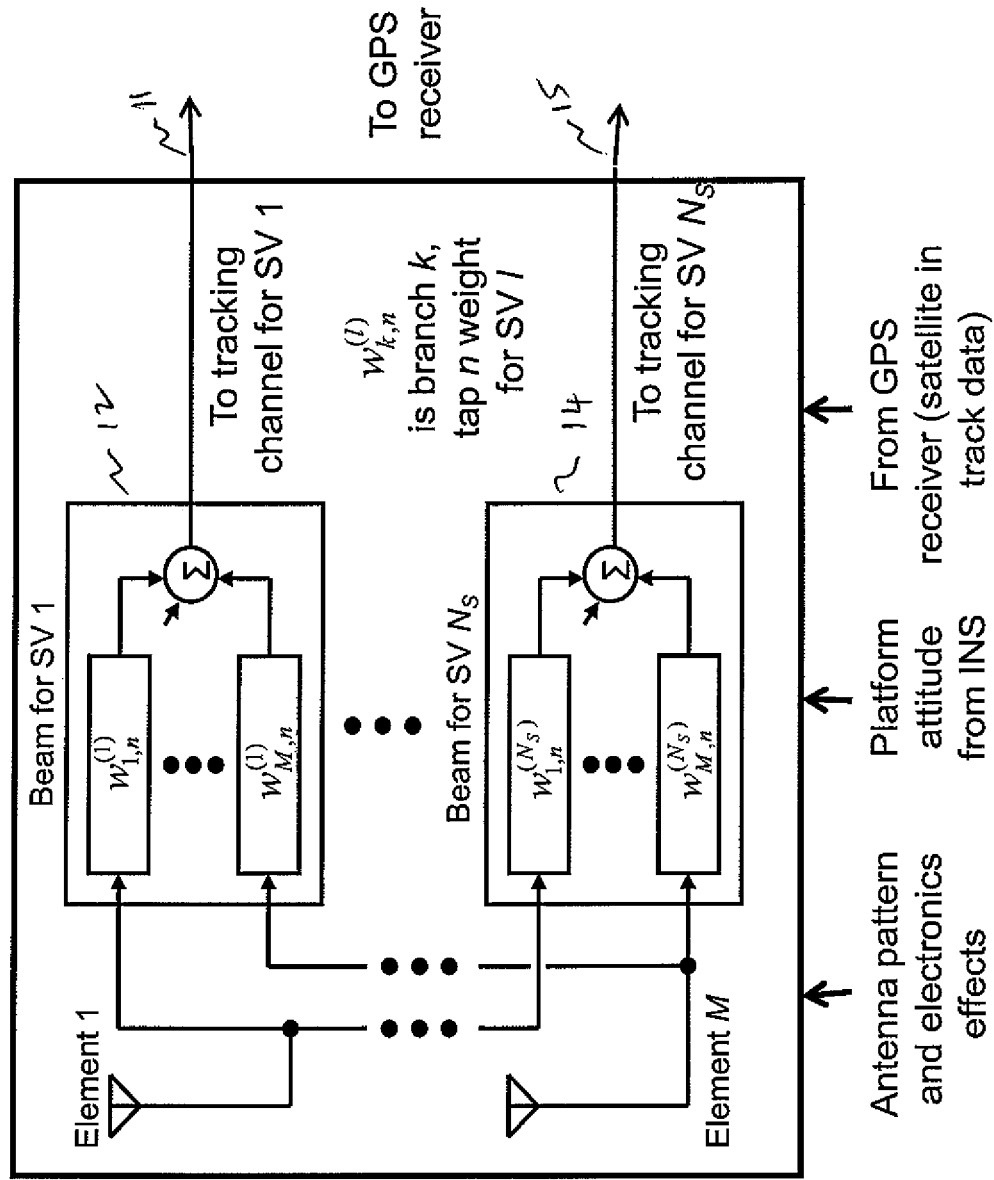
FIG. 1 is a block diagram of the basic architecture of a beamforming (beamsteering) solution for anti-jamming with or without constraints to mitigate distortion to desired signals (e.g., GPS/GNSS), where the smallest boxes containing labels of the form $w_{k,n}^{(l)}$ represent weights (coefficients) for N-tap FIR filters composing a STAP filter branch.

The algorithm in O'Brien1, discussed in the previous section, gives STAP weights that are dependent upon the GPS signal direction-of-arrival (DOA) and so Equation (17) must be computed separately for each GPS satellite of interest, leading to an implementation of $N_S$ different STAP-N filters according to FIG. 1. We, on the other hand, consider bundling together the linear equality constraints in (16a) to provide the instant invention's Constrained Nulling algorithm in a non-beamforming formulation. This then has the implementation implied by FIG. 2 and, thus, requires only one STAP-N filter, e.g. 22, for anti-jamming and preventing distortion for as many as $N_S$ GPS signals (provided that $N_S \leq M$) at the same time.

The desired Constrained Nulling algorithm is obtained by solving the revised QPP:

$$\{\hat{w}, \hat{\alpha}\} = \underset{\{w, \alpha\}}{\operatorname{argmin}}\, w^H \hat{R}\, w \text{ subject to } C^H w = f(\alpha) \quad (30)$$

where $$C=[\underline{s}_1 \ldots \underline{s}_{N_S}\, \underline{\dot{s}}_1 \ldots \underline{\dot{s}}_{N_S}] \in C^{NM \times 2N_S} \quad (31a)$$

$$\underline{f}(\underline{\alpha}) = [1 \ldots 1\, j\alpha_1 \ldots j\alpha_{N_S}]^T \in C^{2N_S \times 1} \quad (31b)$$

Due to bundling, however, a complication arises in that the vector f now depends on a vector of alpha-parameters, where these parameters are not the same for each satellite. Hence, the equation for scalar $\hat{\alpha}$ in Equation (18) does not apply anymore. To solve this new revised problem, the derivation in the Appendix of O'Brien1 is generalized as follows.

It is useful to define the vectors $$\underline{e} = [1\ 1\ \ldots\ 1]^T \in \mathfrak{R}^{N_S}$$

and, $\underline{\alpha} = [\alpha_1 \alpha_2 \ldots \alpha_{N_S}]^T \in \mathfrak{R}^{N_S} \quad (32)$ Solving the revised optimization problem (30) requires working with Lagrange multipliers. For the present problem, the relevant objective function is $$V(\underline{w},\underline{\alpha}) = \underline{w}^H \hat{R} \underline{w} + (\underline{w}^H C - \underline{f}^H(\underline{\alpha}))\underline{\lambda} + \underline{\lambda}^H(C^H \underline{w} - \underline{f}(\underline{\alpha})) \quad (33)$$

Because the Frost solution applies, this expression reduces to $$V(\underline{\alpha}) = \underline{f}^H(\underline{\alpha})[C^H \hat{R}^{-1} C]^{-1} \underline{f}(\underline{\alpha}) \quad (34)$$

by substituting $\underline{w}=\hat{R}^{-1}C[C^H\hat{R}^{-1}C]^{-1}\underline{f}(\alpha)$ into Equation (33), where the equality constraints are now satisfied and hence the terms involving Lagrange multipliers become null.

We next determine the vector $\underline{\alpha}$ that minimizes the positive definite quadratic form of Equation (34), and this will replace the $\underline{\alpha}$ of Equation (18), which represents a special case. For this, we partition $$F = \left[C^H \hat{R}^{-1} C\right]^{-1} = \begin{bmatrix} F_{11} & F_{12} \\ F_{21} & F_{22} \end{bmatrix} \quad (35)$$

The sub-matrices $F_{nm}$ are all $N_S \times N_S$ and $F_{nn}$ are of full rank, and the following symmetries apply:

$F_{21}=F_{12}{}^H$, $F_{11}=F_{11}{}^H$, and $F_{22}=F_{22}{}^H$ since F is Hermitian, and also positive definite.

Using the above definitions, Equation (34) may be rewritten as $$V(\underline{\alpha})=\underline{e}^H F_{11}\underline{e}+2Re\{\underline{b}^H\underline{\alpha}\}+\underline{\alpha}^H F_{22}\underline{\alpha} \quad (36)$$

where $\underline{b}^H=\underline{je}^H F_{12}$

Since Equation (36) is a positive definite quadratic form in the unknown vector $\underline{\alpha}$, the minimizing solution can be shown to be the solution to the linear system of equations below:

$$F_{22}\hat{\underline{\alpha}}=-Re\{\underline{b}\} \quad (37)$$

The objective function minimization to get this solution is achieved either by working with gradient operations or completing the square of the quadratic form of Equation (36). Equations (37) and (38) below:

$$\hat{\underline{w}}=\hat{R}^{-1}C[C^H\hat{R}^{-1}C]^{-1}\underline{f}(\hat{\underline{\alpha}}) \quad (38)$$

comprise the Constrained Nulling algorithm. The weight vector given by Equation (38) applies to $N_S \leq M$ satellites for the antijam system implemented with the desired structure of FIG. 2.

Regularization

A practical concern over the bundling of constraints is that although $C^H \hat{R}^{-1} C \in C^{2N_S \times 2N_S}$ has a mathematical inverse, it may be very poorly conditioned for inversion with practical computing machinery. The risk of ill-conditioning arises because the condition number of a product of matrices is approximately a product of the condition numbers of the individual factors. Thus, even if the condition numbers of C and $\hat{R}^{-1}$ are not very big, their product may possess an intolerably large condition number. We have devised a general approach to preventing this problem by regularizing the inverse problem using a suitable diagonal scaling matrix transformation.

The risk of ill-conditioning is observed in the algorithm for obtaining C assuming the UCA antenna modeling approach, which has the elements of C according to Equations (28) and (29). Equation (26) shows that because the chip duration $T_c$ is very small, the elements of $[\dot{S}_k(0)]_n$ will be huge in relation to those of $[S_k(0)]_n$, leading to C with a fairly large condition number (e.g., cond(C)~$10^8$) and the sample covariance matrix with a somewhat less large, condition number of, say, $10^6$. The condition number of the product $C^H\hat{R}^{-1}C \in C^{2N_S \times 2N_S}$ is then usually unacceptably large, even for computations performed in double-precision floating-point arithmetic. However, upon recognizing that the problem is due to poor scaling of the columns of C, we can change the calculation as follows to prevent ill-conditioning.

We define $\underline{\dot{s}}'$ via:

$$\underline{\dot{s}} = \frac{1}{T_c}\underline{\dot{s}}' \quad (39)$$

The bundled constraint matrix $C \in C^{NM \times 2N_S}$ may now be now expressed as $$C=[\underline{s}_1 \ldots \underline{s}_{N_S}\underline{\dot{s}}_1' \ldots \underline{\dot{s}}_{N_S}']D=C'D \quad (40)$$

where the re-scaling diagonal matrix D is $$D = diag\left\{\underbrace{1 \ldots 1}_{N_S ones} \underbrace{T_c^{-1} \ldots T_c^{-1}}_{N_S values}\right\} \in \Re^{2N_S \times 2N_S} \quad (41)$$

Thus, the equality constraints $C^H\underline{w}=\underline{f}$ now become $D(C')^H\underline{w}=\underline{f}$ or, alternatively, $$(C')^H\underline{w}=D^{-1}\underline{f}=\underline{f}'(42)$$

Although F of Equation (35) is now expressed in terms of C' rather than C, the subsequent calculation for the alpha parameters is not changed and will yield $\underline{f}'$.

The revised Frost calculation for the optimal weight vector of the regularized problem then becomes $$\hat{\underline{w}}=\hat{R}^{-1}C'[(C')^H\hat{R}^{-1}C']^{-1}\underline{f}' \quad (43)$$

Mathematically, the re-scaled problem is identical to the original one, but numerically the two problems are entirely different. The efficacy of the above regularization has been verified in simulation (e.g., MATLAB).

A re-scaling-based regularization procedure for real antenna data would be based on considering the norms of "s" and "sdot" vectors prior to regularizing in order to assess their dynamic range, and hence an appropriate choice of diagonal elements for D. This procedure would be obvious to a person of ordinary skill in the art and is well within such person's capability.

Implementation of the Frost Calculation

The central computational problem of Constrained Nulling is to determine the inverse of $C^H\hat{R}^{-1}C \in C^{2N_S \times 2N_S}$ which is core to the Frost calculation, and which inverse exists provided that we enforce $N_S \leq M$ and we avoid any ill-conditioning. In principle, the matrix C may be pre-computed and saved in memory, though the memory requirements may be rather substantial. We must begin with a review of how to implement the Unconstrained Nulling (UN) calculation.

UN, as in Equation (14), is computationally "nice" because we do not actually need to explicitly form the inverse of the sample covariance matrix. We may proceed by performing the QR-factorization of the data matrix followed by forward elimination and back-substitution to obtain the final desired weight vector. This process is described in detail as follows, but is already known to those with skill in the art.

The sample covariance matrix possesses a particular block structure. Specifically, $$\hat{R} = \begin{bmatrix} \Re_{0,0} & \Re_{0,1} & \cdots & \Re_{0,M-1} \\ \Re_{1,0} & \Re_{1,1} & \cdots & \Re_{1,M-1} \\ \vdots & \vdots & & \vdots \\ \Re_{M-1,0} & \Re_{M-1,1} & \cdots & \Re_{M-1,M-1} \end{bmatrix} \in C^{NM \times NM} \quad (44)$$

where $$\Re_{i,j} = \frac{1}{K} X_i X_j^H \in C^{N \times N} \quad (45)$$

for which $x_i(n)$ (in Equation (46) below) is the complex-valued sample sequence for antenna element i at sample time n, and we assume the collection of K samples per antenna element.

$$X_i = \begin{bmatrix} x_i(0) & x_i(1) & x_i(2) & \cdots & x_i(K-2) & x_i(K-1) \\ 0 & x_i(0) & x_i(1) & \cdots & x_i(K-3) & x_i(K-2) \\ \vdots & \vdots & \vdots & & \vdots & \vdots \\ 0 & 0 & 0 & \cdots & x_i(K-N) & x_i(K-N+1) \\ 0 & 0 & 0 & \cdots & x_i(K-N-1) & x_i(K-N) \end{bmatrix} \quad (46)$$

and for which $X_i \in C^{N \times K}$ is a Toeplitz matrix, but is generally rectangular. We may also rewrite (44) in yet another way in terms of data matrices. If we define the data matrix as $$Y = \begin{bmatrix} X_0 \\ X_1 \\ \vdots \\ X_{M-1} \end{bmatrix} \in C^{NM \times K} \Rightarrow Y^H = [X_0^H \ X_1^H \ \cdots \ X_{M-2}^H X_{M-1}^H] \in C^{K \times NM} \quad (47)$$

Then, $$\hat{R} = \frac{1}{K} Y Y^H \quad (48)$$

It may, therefore, be noted that the sample covariance matrix is constructible by a block outer-product of the data matrix with itself.

Now, suppose that the QR-factorization of the data matrix Y is $$Y^H = QU \quad (49)$$

where Q is a unitary matrix and can be obtained by Givens rotations practically implementable using CORDIC arithmetic units, or by Householder transformations for which CORDIC-like operations may also be applied, S.-F. Hsiao, J.-M. Delosme, "Householder CORDIC Algorithms," IEEE Trans. on Computers, 44(8), Aug. 1995, pp. 990-1001. The MUSE algorithm (See, C. M. Rader, D. L. Allen, D. B. Glasco, C. E. Woodward, *MUSE—A Systolic Array for Adaptive Nulling with* 64 *Degrees of Freedom, Using Givens Transformations and Wafer Scale Integration*, MIT Lincoln Laboratory, Tech. Report 886, 18 May 1990, 86 pages; See also, C. M. Rader, "VLSI Systolic Arrays for Adaptive Nulling," IEEE Signal Proc. Magazine, July 1996, pp. 29-49) actually uses the Givens rotations approach due to its ready realization in the form of a systolic array, and where STAP weight computation is achieved without direct matrix inversion via the QR-factorization of the data matrix followed by forward elimination/back-substitution computations.

The matrix factor U in Equation (49) is upper triangular. By substituting for $Y^H$ from Equation (49) into Equation (48) we obtain $$\hat{R} = \frac{1}{K} Y Y^H = \frac{1}{\sqrt{K}} \frac{1}{\sqrt{K}} U^H Q^H Q U = LL^H \quad (50)$$

We have $Q^H Q = I$ (identity matrix) because Q is unitary. Also, $$L = \frac{1}{\sqrt{K}} U^H$$

is lower triangular.

For the UN calculation in Equation (14), we, therefore, work with $$LL^H \hat{\underline{w}} = \underline{u} \quad (51)$$

If we define $$\underline{z} = L^H \hat{\underline{w}} = \frac{1}{\sqrt{K}} U \hat{\underline{w}},$$

equation $L\underline{z} = \underline{u}$ can be solved for $\underline{z}$ via forward elimination. The desired weight vector, $\hat{\underline{w}}$, may then be determined using $U\hat{\underline{w}} = \sqrt{K}\underline{z}$ by back-substitution of the calculated $\underline{z}$ value. Using this approach $\hat{R}^{-1}$ is simply never formed.

However, determining the matrix product $C^H \hat{R}^{-1} C$ in the Frost calculation requires knowing $\hat{R}^{-1}$. A possible way to determine this inverse matrix is by the use of Equation (50) which means that we use the aforementioned MUSE approach (implementation) first to find the lower triangular factor $\underline{L}$ in $\hat{R} = LL^H \in C^{NM \times NM}$.

The inverse of the sample covariance matrix here can be written as a column-wise partition:

$$\hat{R}^{-1} = [\underline{r}_1 \ \underline{r}_2 \ \cdots \ \underline{r}_{NM}] \quad (52)$$

The column vectors $\underline{r}_k$ in Equation (52) may be obtained using forward elimination and back-substitution as follows. Following Equation (50)

$$L\underbrace{L^H \hat{R}^{-1}}_{=Y} = I = [\underline{e}_1 \ \underline{e}_2 \ \cdots \ \underline{e}_{NM}] \quad (53)$$

where $\underline{e}_k$ is a unit vector composing the identity matrix column k. Similarly, matrix Y indicated in Equation (53) (not the data matrix) too could be partitioned into its constituent columns according to $$Y = [\underline{y}_1 \underline{y}_2 \cdots \underline{y}_{NM}] \quad (54)$$

Therefore, $$L[\underline{y}_1 \underline{y}_2 \cdots \underline{y}_{NM}] = [\underline{e}_1 \underline{e}_2 \cdots \underline{e}_{NM}] \quad (55)$$

By executing NM forward elimination steps, we can obtain the columns of matrix Y. Finally, since as defined in Equation (53)

$$L^H[\underline{r}_1\ \underline{r}_2\ \ldots\ \underline{r}_{NM}] = [\underline{y}_1\underline{y}_2\ \ldots\ \underline{y}_{NM}] \quad (56)$$

the columns of the inverse of $\hat{R}$ can, therefore, be obtained by executing NM back-substitution steps. This approach has the advantage that the multiple forward eliminations and back-substitutions are implementable as systolic array calculations.

An alternative to getting $\hat{R}^{-1}$ is to realize a system (hardware) that computes $L^{-1}$ directly since, if the triangular factorization $\hat{R}=LL^H$ were available, we would have $$\hat{R}^{-1}=(L^{-1})^H L^{-1}=UU^H \quad (57)$$

We note that the inverse of a nonsingular lower triangular matrix is lower triangular, and then its Hermitian transpose is upper triangular.

If we now have the triangular factorization of Equation (57), the Frost calculation takes the form $$\hat{w}=UU^H C[C^H UU^H C]^{-1}\underline{f}(\hat{\alpha})=UV[V^H V]^{-1}\underline{f}(\hat{\alpha}) \quad (58)$$

where $V=U^H C$. Another MUSE-like calculation, as above, may be performed to obtain $F=[V^H V]^{-1}$, from which the weight vector $\hat{w}$ can be calculated.

Constrained Nulling vs Unconstrained Nulling Performance Simulations

Using Monte Carlo simulations, we have verified that Constrained Nulling prevents phase distortion. We then modeled the antijam performance to determine if there was any significant loss of antijam protection with Constrained Nulling as compared with Unconstrained Nulling.

Figure 3:
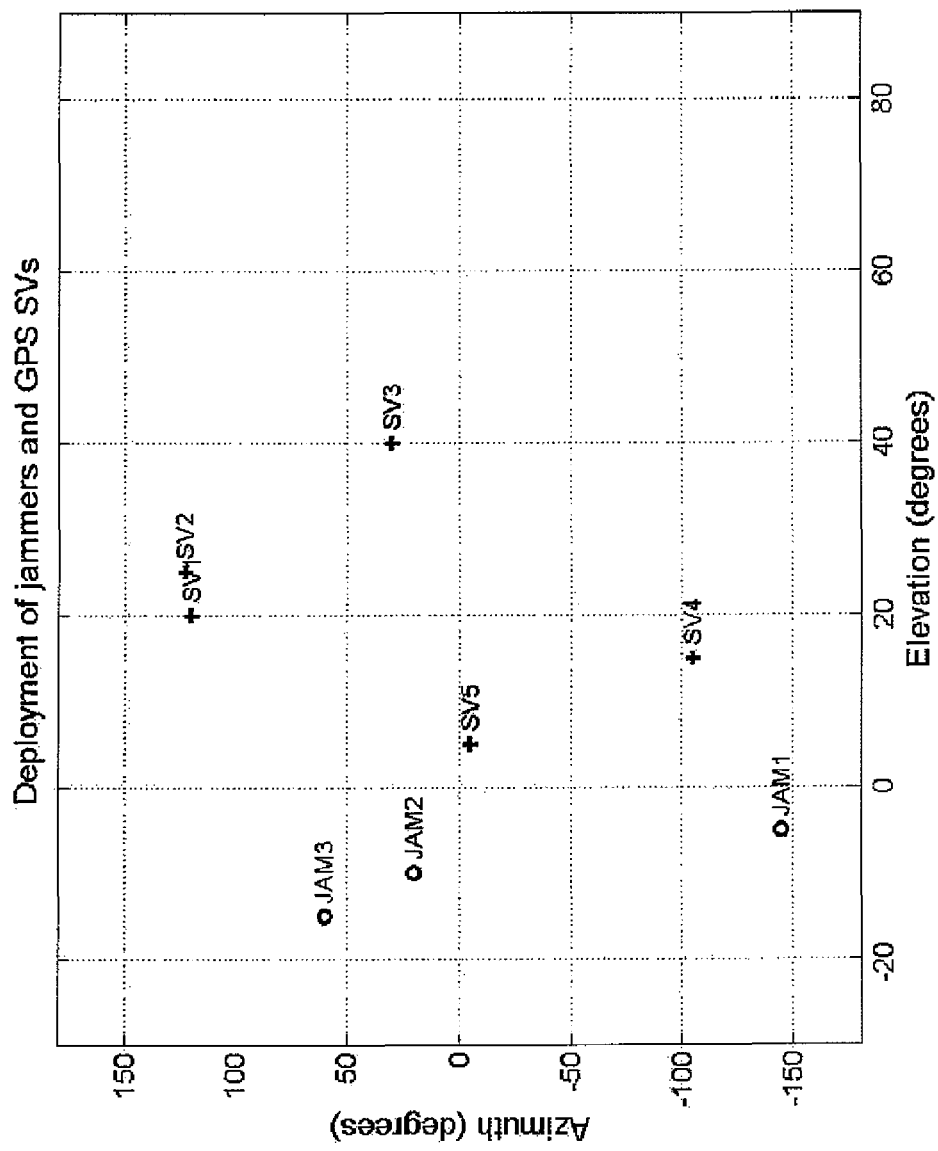
FIG. 3 is a plot depicting the relative location in azimuth and elevation of three jammers and five GPS SVs, where a null in the jammer J2 direction is depicted for illustration, and the jammers are at a low elevation angle in relation to GPS SV elevations typical of the anti-jamming algorithm use on an airborne platform where the jammers are in fixed locations on the ground.

FIG. 3 shows the deployment scenario for the satellites (SV1, SV2, SV3, SV4, SV5) and jammers (JAM1, JAM2, JAMS) used in the simulation work.

A STAP-5 filter for a five-element L1-band UCA was assumed. Consistent with the earlier discussion, five satellite constraints were used for Constrained Nulling. The satellites SV1 through SV5 were used for investigating antijam performance.

The sample block size used for the simulations was K=250 samples. The mean null depths and ±1-sigma uncertainties were determined based on 100 Monte Carlo runs. The three jammers were either (a) all Continuous Wave, CW, or (b) all Broadband, BB, (phase-randomized tone model). For the CW case, the three jammers were respectively centered about the following frequencies: L1, L1+10 MHz, and L1−10 MHz ('L1' means GPS L1 band center frequency of 1575.42 MHz). The jammer-to-noise ratio (JNR) was 45 dB in all cases. Only one STAP weight vector was produced by Constrained Nulling as also by Unconstrained Nulling (for reference comparison purposes); both weight vectors were normalized to possess a unit 2-norm (Euclidean norm). The Constrained Nulling assumed chip-matched filtering for the P(Y)-code.

Verification of Distortionless Response

Figure 4:
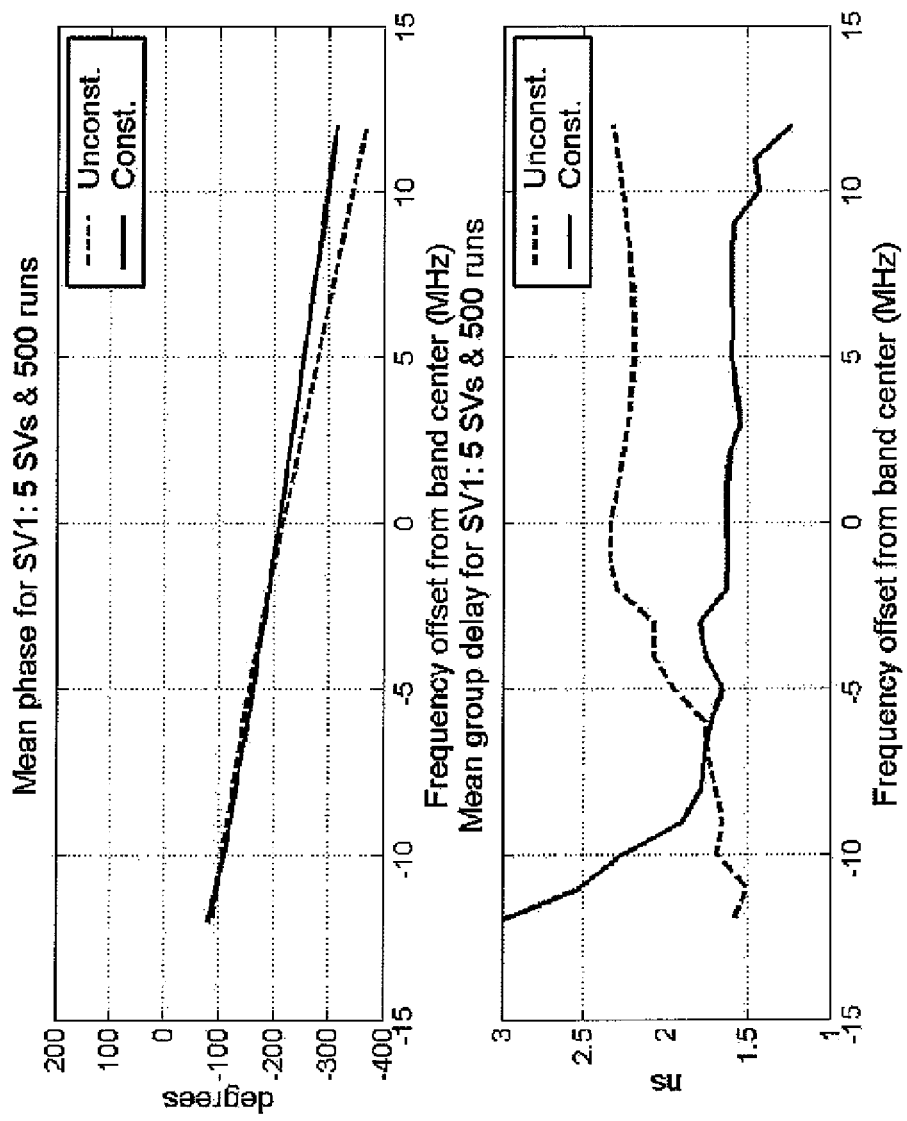
FIG. 4 is a plot of the mean unwrapped phase and group delay responses in the GPS SV1 direction in the case of both UN and CN.
Figure 5:
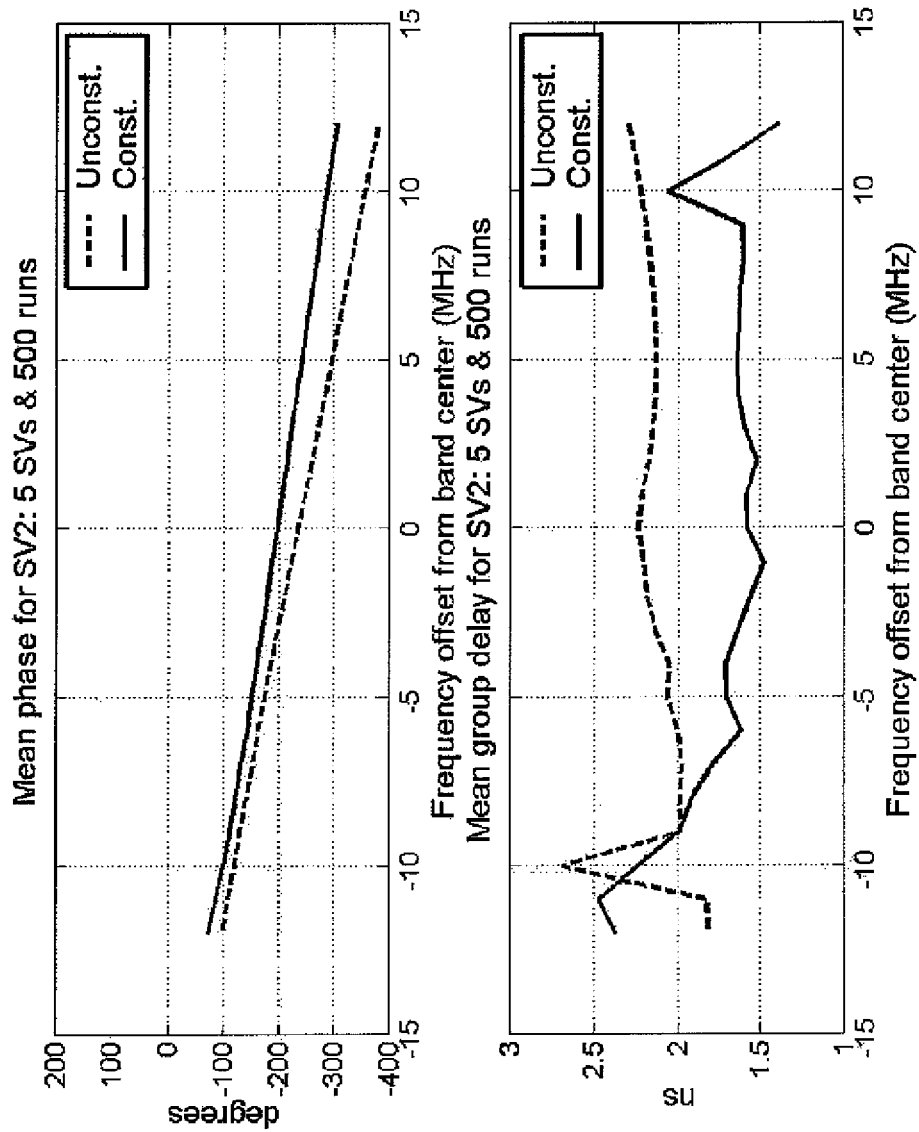
FIG. 5 is a plot of the mean unwrapped phase and group delay responses in the GPS SV2 direction in the case of both UN and CN.
Figure 6:
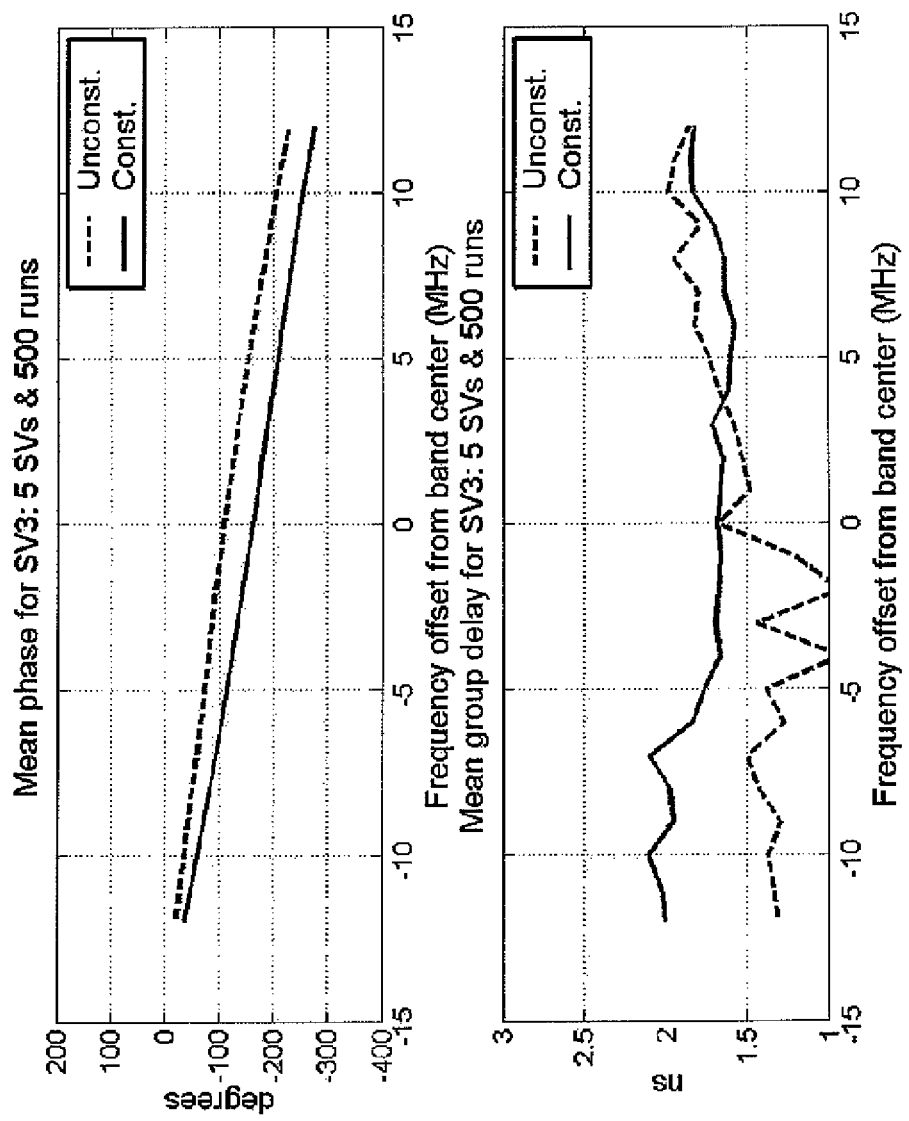
FIG. 6 is a plot of the mean unwrapped phase and group delay responses in the GPS SV3 direction in the case of both UN and CN.
Figure 7:
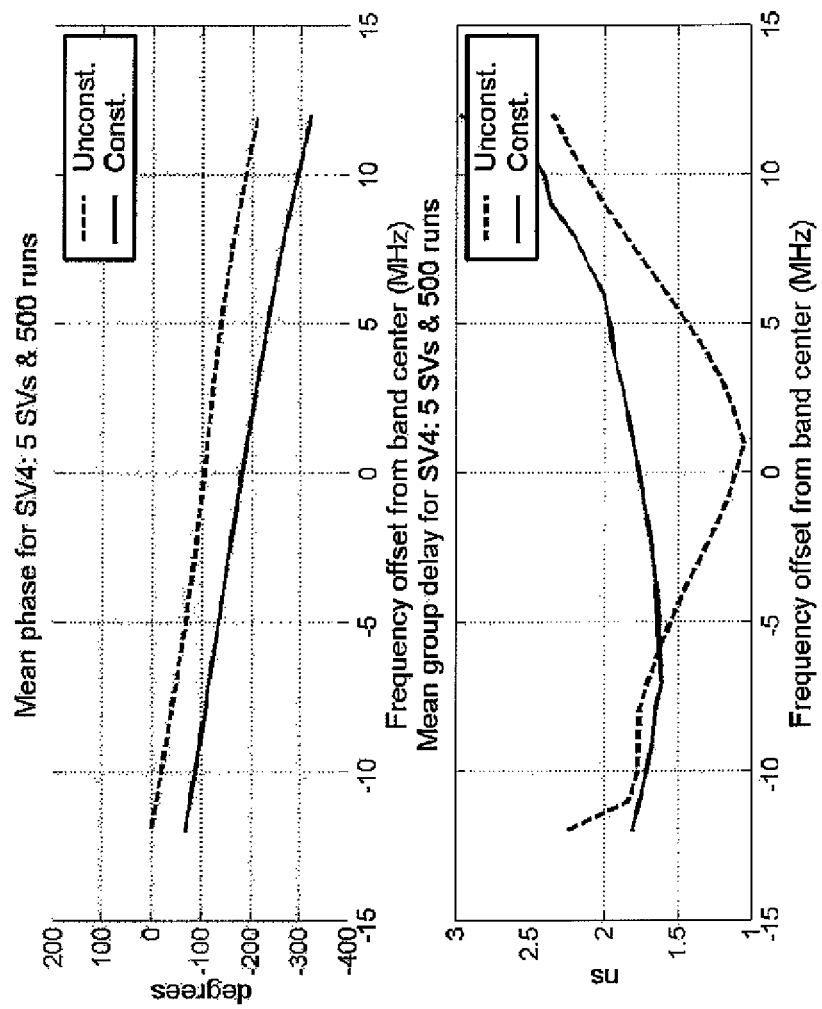
FIG. 7 is a plot of the mean unwrapped phase and group delay responses in the GPS SV4 direction in the case of both UN and CN.
Figure 8:
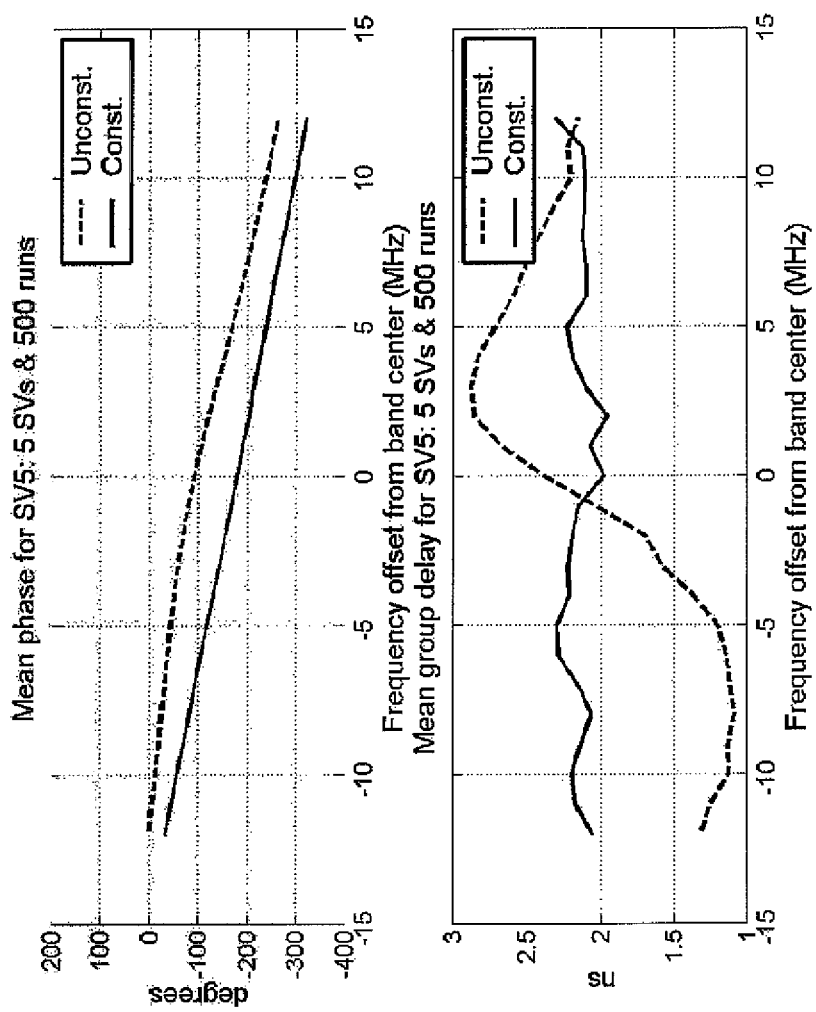
FIG. 8 is a plot of the mean unwrapped phase and group delay responses in the GPS SV5 direction in the case of both UN and CN.

The verification of the distortionless response in the five GPS SV directions is shown in FIGS. 4 through 8, which show the phase responses (Equation (3)) and group delays (Equation (4)) of the distortion model transfer function (Equation (1)) along each of the five satellite directions. Since satellites SV1 and SV2 are close together in azimuth and elevation, the plots for these two satellites are expected to be very similar, as shown in FIG. 4 (for SV1) and FIG. 5 (for SV2). Moreover, these two satellites are at greater distances from the jammers than the other satellites, and are, therefore, in what is likely to be a "good" part of the antenna pattern in relation to the jammers. Hence the distortion due to STAP for UN is not expected to be much worse than for CN for these SV1 and SV2 satellites. The phase and group delay plots in FIG. 4 and in FIG. 5 appear to generally agree with this expectation.

The FIG. 4 plots serve as a useful reference with which to compare the plots for the other satellites, namely, SV3 (FIG. 6), SV4 (in FIG. 7) and SV5 (in FIG. 8), where the distortion due to unconstrained nulling is noticeably worse than for the constrained milling case in the P(Y)-code band. Since, as noted above, satellites SV3, SV4, and SV5 are closer to the jammers than satellites SV1 and SV2, and, thus, in less favorable parts of the antenna pattern, the distortion mitigating benefits of CN versus UN are expected to be clearer (for satellites SV3, SV4, and SV5).

It is, therefore, clear that for Constrained Nulling the phase is much more linear and the group delay much 'flatter' over the P(Y)-code band than for Unconstrained Nulling.

Verification of Nulling Performance

Figure 9:
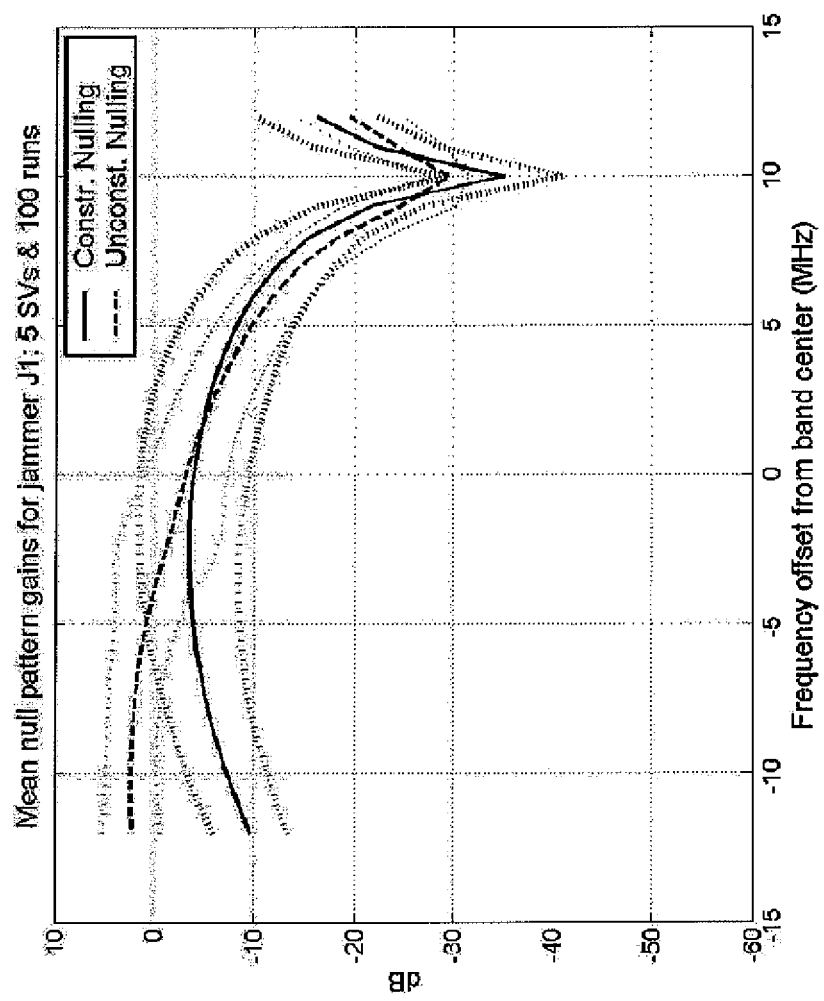
FIG. 9 is a plot of the mean null patterns and ±1σ curves of the nulling patterns for CN and UN in the direction of CW Jammer J1.
Figure 10:
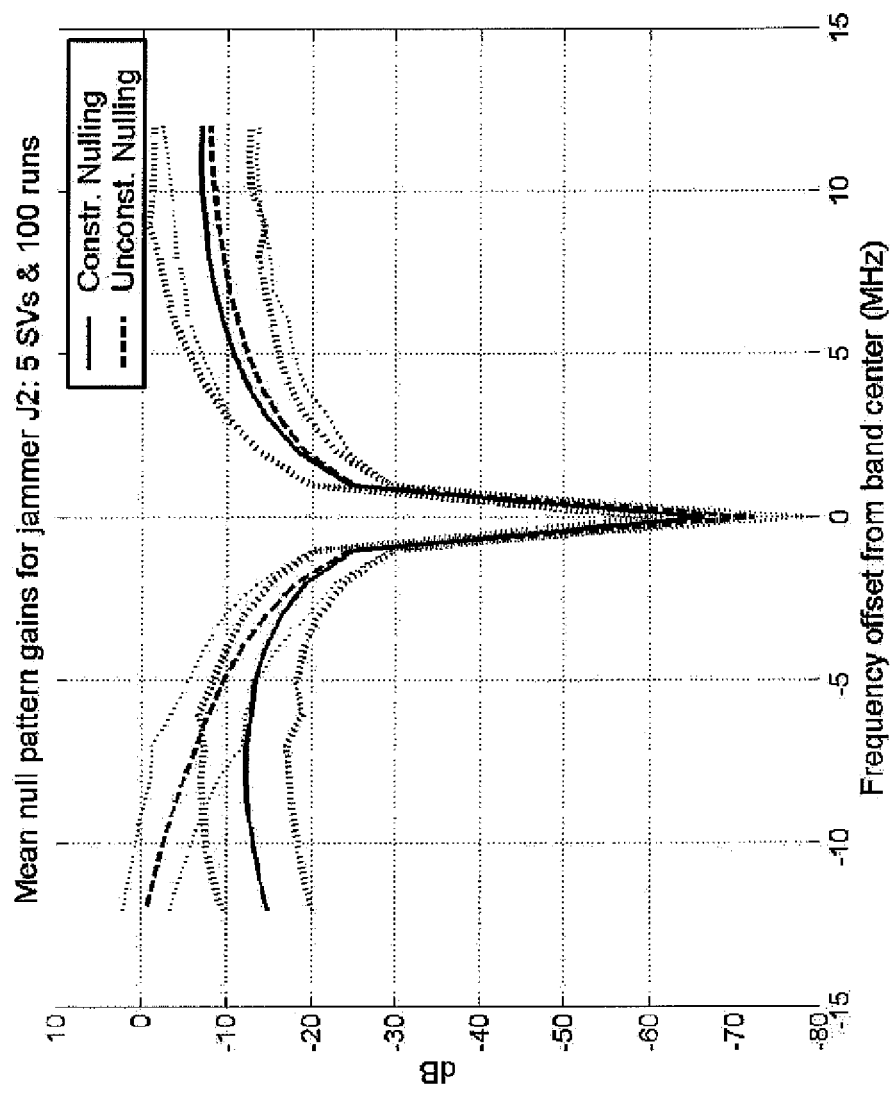
FIG. 10 is a plot of the mean null patterns and ±1σ curves of the nulling patterns for CN and UN in the direction of CW Jammer J2.
Figure 11:
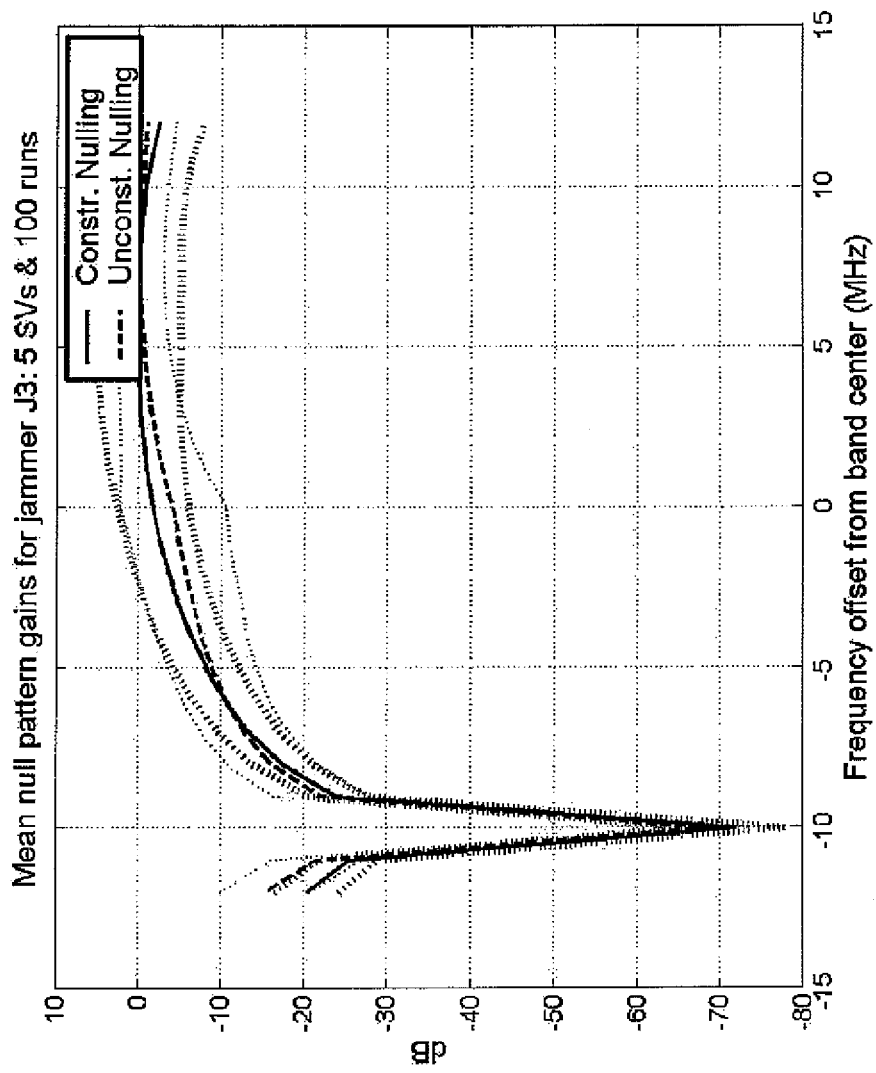
FIG. 11 is a plot of the mean null patterns and ±1σ curves of the nulling patterns for CN and UN in the direction of CW Jammer J3.

FIG. 9 through FIG. 11 show the nulling performance for both UN and CN against each of the three CW jammers (J1, J2, and J3).

Nulling plots in this sub-section are plots of $20\log_{10}|H(\theta, \phi, f)|$ versus frequency f over the band of interest (here the L1 band) for the jammer DOA $(\theta, \phi)$, as has been noted earlier. The solid lines represent mean values from the 100 Monte Carlo runs and the dashed lines the ±1σ uncertainties.

Figure 12:
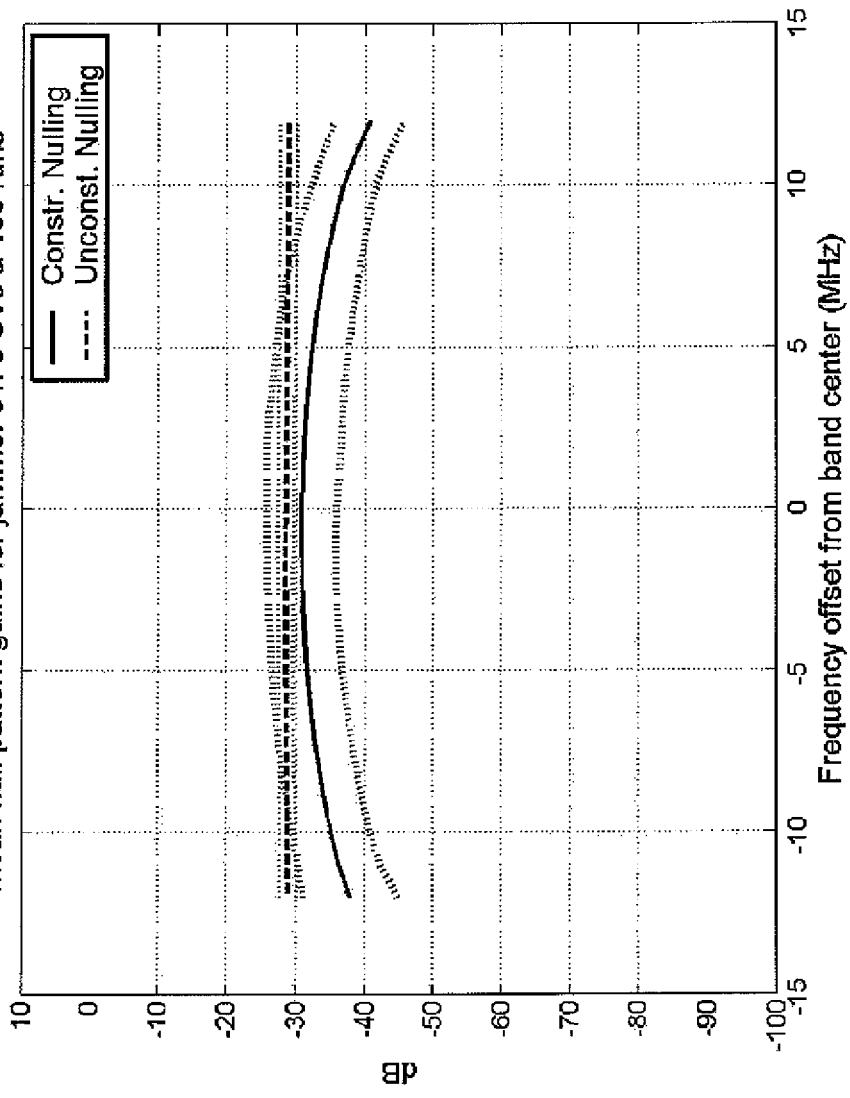
FIG. 12 is a plot of the mean null patterns and ±1σ curves of the nulling patterns for CN and UN in the direction of BB Jammer J1.
Figure 13:
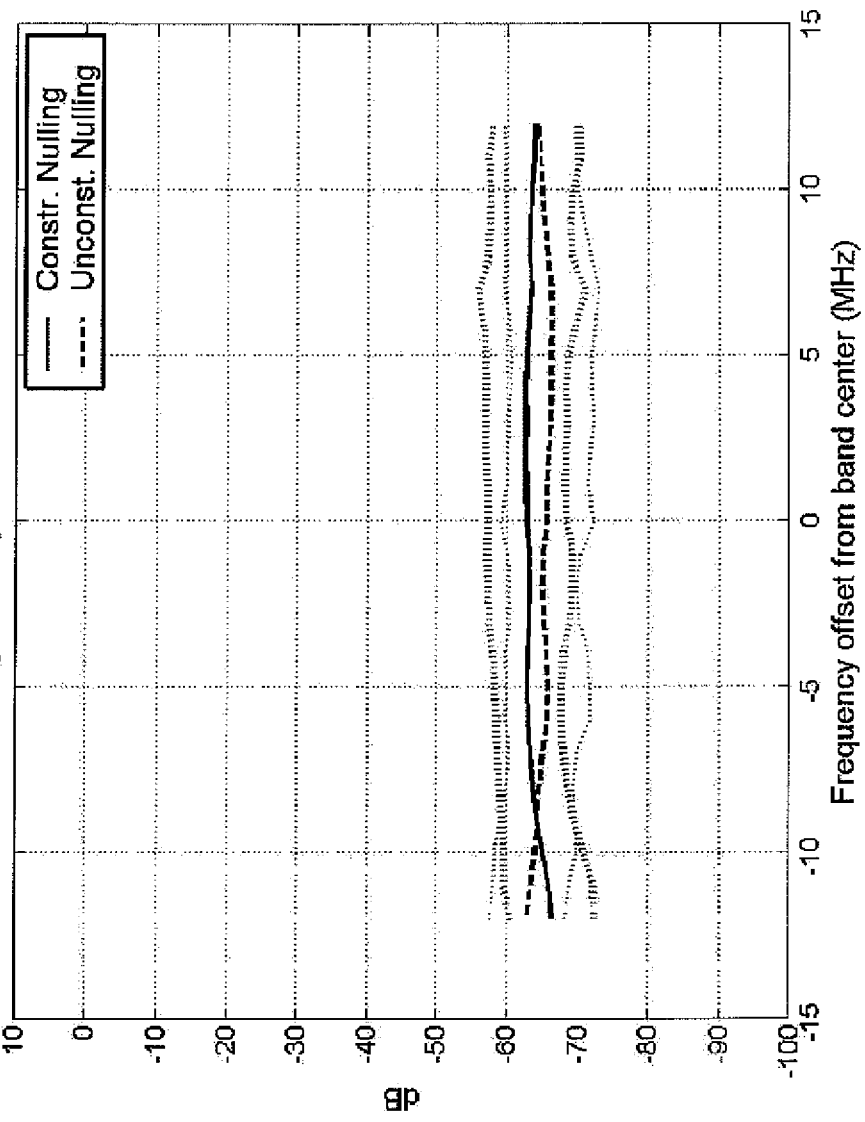
FIG. 13 is a plot of the mean null patterns and ±1σ curves of the nulling patterns for CN and UN in the direction of BB Jammer J2.
Figure 14:
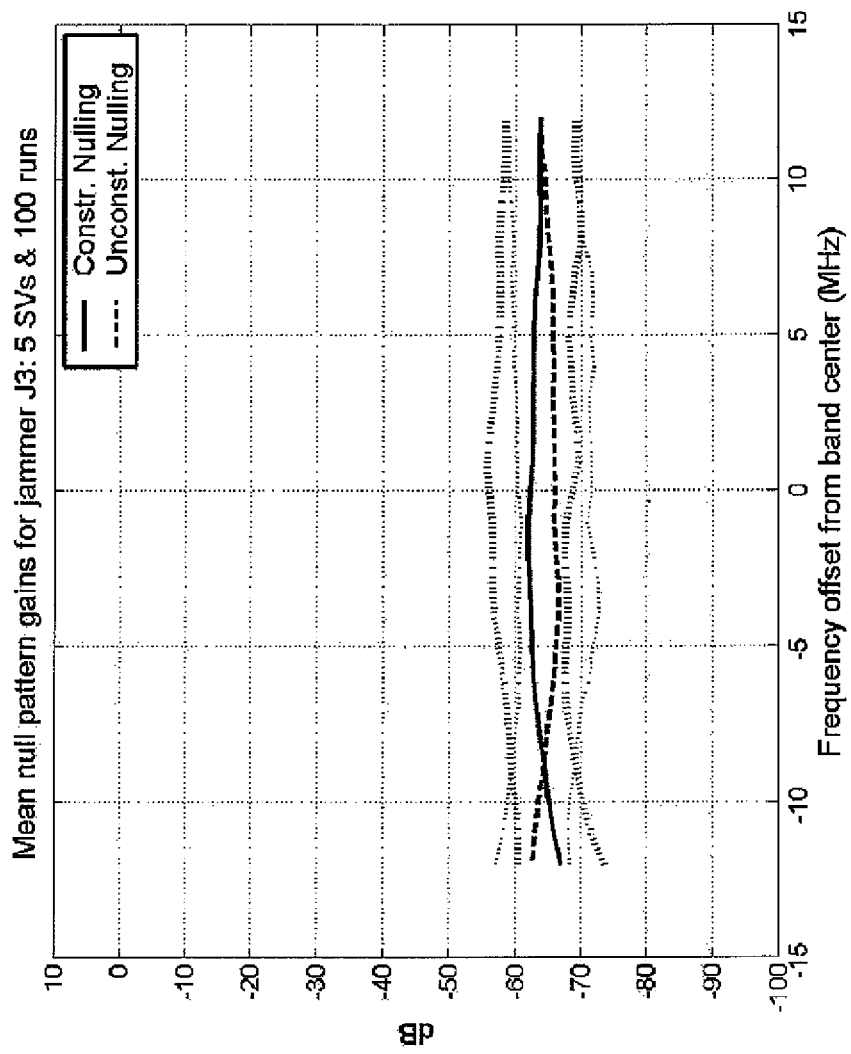
FIG. 14 is a plot of the mean null patterns and ±1σ curves of the nulling patterns for CN and UN in the direction of BB Jammer J3.

Similarly, FIG. 12 through FIG. 14 show the nulling performance of the UN and CN algorithms against each of the three BB jammers.

A summary of the null-depth performance simulation results for Unconstrained and Constrained Nulling versus CW and BB jammers is presented in the table of FIG. 15.

It is to be expected that the null depth for Constrained Nulling will occasionally be better than for Unconstrained Nulling. The reason is that the probability distributions of null depths for the two cases overlap significantly. From nulling plots we see that the 1-σ distribution variances are fairly large and the mean values are not far apart. There is a slight loss (about 0.75 dB) of antijam protection for Constrained Nulling relative to Unconstrained Nulling, if the results of the Table (FIG. 15) are averaged. Thus, any loss of antijam associated with Constrained Nulling is within acceptable limits.

We have disclosed a Constrained Nulling code/carrier phase compensation (CPC) method that is executed entirely within the antenna electronics, and for which the algorithm has been fully specified. Examples of alternative embodiments include execution of this procedure in the GPS receiver electronics or other standalone electronics, and all such alternative embodiments are within the scope of the invention claimed herein. The simulation results confirm that the claimed invention prevents distortion to both the average carrier phase and the average code phase of the received GPS signals by enforcing a distortionless response of the STAP filter's distortion model transfer function, even as any degradation to the nulling performance is seen to be insignificant.

The words "including," "comprising," "having," and "with" as used herein are to be interpreted broadly. Moreover, any embodiments disclosed herein must not be taken as the only possible embodiments. Other embodiments will occur to those skilled in the art and are within the scope of the claims herein.

We claim:

1. A non-beamforming system for nulling interference signals received with GPS signals at an antenna array without carrier and code mean phase distortion of said GPS signals comprising:

an antenna array having a plurality of antenna array elements for receiving GPS signals from a plurality of satellites;

each antenna array element having a signal channel that outputs the GPS signals and interference signals received at said each antenna array element; and a single Space Time Adaptive Processing (STAP) filter configured to receive the output signals from the plurality of antenna array element signal channels, null the interference signals by applying constraints to the filter weights, and output carrier and code mean phase distortionless GPS signals along a common signal path.

2. The system of claim 1, wherein the constraints are bundled.

3. The system of claim 2, wherein a regularization procedure is used for determining the constrained filter weight vector.

4. The system of claim 3, wherein the regularization procedure includes a diagonal scaling matrix transformation.

5. The system of claim 2, wherein the filter weights depend on the choice of spreading code.

6. The system of claim 1, wherein the filter minimizes interference signal power.

7. The system of claim 1, wherein the filter is housed in antenna electronics.

8. The system of claim 1, wherein the filter is housed in a GPS receiver.

9. The system of claim 1, wherein the filter comprises stand alone electronics.

10. The system of claim 1, wherein nulling interference signals includes mean code phase compensation and mean carrier phase compensation of the GPS signals.

11. The system of claim 1, wherein the antenna array is a Uniform Circular Array (UCA) antenna array.

12. The system of claim 1, wherein the antenna array is a Controlled Reception Pattern Antenna (CRPA) array.

13. The system of claim 1, wherein the number of satellites for which signals are processed does not exceed the number of antenna array elements.

14. A GPS receiver comprising:

an antenna array having a plurality of antenna array elements for receiving GPS signals from a plurality of satellites;

each antenna array element having a signal channel that outputs the GPS signals and interference signals received at said each antenna array element; and a single non-beamforming Space Time Adaptive Processing (STAP) filter configured to receive the output signals from the antenna array element signal channels, null the interference signals by applying constraints to the filter weights, and output carrier and code mean phase distortionless GPS signals along a common signal path for further receiver processing.

15. The GPS receiver of claim 14, wherein the constraints are bundled.

16. The GPS receiver of claim 15, wherein a regularization procedure is used for determining the constrained filter weight vector.

17. The GPS receiver of claim 16, wherein the regularization procedure includes a diagonal scaling matrix transformation.

18. The GPS receiver of claim 14, wherein the filter weights depend on the choice of the spreading code.

19. The GPS receiver of claim 14, wherein the filter minimizes interference signal power.

20. The GPS receiver of claim 14, wherein nulling interference signals includes mean carrier phase compensation and mean code phase compensation of the GPS signals.

21. The GPS receiver of claim 14, wherein the antenna array is a Uniform Circular Array (UCA) antenna array.

22. The GPS receiver of claim 14, wherein the antenna array is a Controlled Reception Pattern Antenna (CRPA) array.

23. The GPS receiver of claim 14, wherein the number of satellites for which signals are processed does not exceed the number of antenna array elements.

24. A non-beamforming method for nulling interference signals received with GPS signals at an antenna array without carrier and code mean phase distortion of said GPS signals comprising the steps of:

receiving GPS signals from a plurality of satellites at an antenna array having a plurality of antenna array elements, each said antenna array element having a signal channel;

outputting from each antenna array element signal channel the GPS signals and interference signals received at said each antenna array element;

receiving at a single Space Time Adaptive Processing (STAP) filter the output signals from the plurality of antenna array element signal channels, filtering the received output signals at said single STAP filter by applying constraints to the filter weights; and outputting from said single filter carrier and code mean phase distortionless GPS signals along a common signal path for GPS receiver processing.

25. The method of claim 24, wherein the constraints are bundled.

26. The method of claim 24, wherein a regularization procedure is used for determining the constrained filter weight vector.

27. The method of claim 26, wherein the regularization procedure includes a diagonal scaling matrix transformation.

28. The method of claim 24, wherein the filter weights depend on the choice of spreading code.

29. The method of claim 24, wherein the filter minimizes interference signal power.

30. The method of claim 24, wherein the filter is housed in antenna electronics.

31. The method of claim 24, wherein the filter is housed in the GPS receiver.

32. The method of claim 24, wherein the filter comprises stand alone electronics.

33. The method of claim 24, wherein nulling interference signals includes mean code phase compensation and mean carrier phase compensation of the GPS signals.

34. The method of claim 24, wherein the antenna array is a Uniform Circular Array (UCA) antenna array.

35. The method of claim 24, wherein the antenna array is a Controlled Reception Pattern Antenna (CRPA) array.

36. The method of claim 24, wherein the number of satellites for which signals are processed does not exceed the number of antenna array elements.

* * * * *